United States Patent
Cheng et al.

(10) Patent No.: US 9,838,672 B2
(45) Date of Patent: Dec. 5, 2017

(54) APPARATUS AND METHOD FOR REFERRING TO MOTION STATUS OF IMAGE CAPTURE DEVICE TO GENERATE STEREO IMAGE PAIR TO AUTO-STEREOSCOPIC DISPLAY FOR STEREO PREVIEW

(71) Applicant: MEDIATEK INC., Hsin-Chu (TW)

(72) Inventors: Chia-Ming Cheng, Hsinchu (TW);
Po-Hao Huang, Kaohsiung (TW);
Yuan-Chung Lee, Tainan (TW)

(73) Assignee: MEDIATEK INC., Hsin-Chu (TW)

( * ) Notice: Subject to any disclaimer, the term of this patent is extended or adjusted under 35 U.S.C. 154(b) by 412 days.

(21) Appl. No.: 14/272,491

(22) Filed: May 7, 2014

(65) Prior Publication Data

US 2014/0340491 A1    Nov. 20, 2014

Related U.S. Application Data

(60) Provisional application No. 61/824,060, filed on May 16, 2013.

(51) Int. Cl.
*H04N 13/04* (2006.01)
*H04N 5/14* (2006.01)
*H04N 13/00* (2006.01)

(52) U.S. Cl.
CPC ......... *H04N 13/0402* (2013.01); *H04N 5/144* (2013.01); *H04N 13/0022* (2013.01);
(Continued)

(58) Field of Classification Search
CPC .................. H04N 13/0402; H04N 13/0022
See application file for complete search history.

(56) References Cited

U.S. PATENT DOCUMENTS 7,893,342 B2    2/2011  Sugimoto
2012/0287250 A1  11/2012 Doutre
(Continued)

FOREIGN PATENT DOCUMENTS

CN    102547324 A    7/2012
CN    102915557 A    2/2013
(Continued)

OTHER PUBLICATIONS

Chang, Content-Aware Display Adaptation and Interactive Editing for Stereoscopic Images, pp. 1-12, IEEE Transactions on Multimedia, 2011.

*Primary Examiner* — Mehrdad Dastouri
*Assistant Examiner* — Rowina Cattungal
(74) *Attorney, Agent, or Firm* — Winston Hsu

(57) ABSTRACT

A stereo preview apparatus has an auto-stereoscopic display, an input interface, a motion detection circuit, and a visual transition circuit. The input interface receives at least an input stereo image pair including a left-view image and a right-view image generated from an image capture device. The motion detection circuit evaluates a motion status of the image capture device. The visual transition circuit generates an output stereo image pair based on the input stereo image pair, and outputs the output stereo image pair to the auto-stereoscopic display for stereo preview, wherein the visual transition circuit refers to the evaluated motion status to configure adjustment made to the input stereo image pair when generating the output stereo image pair.

20 Claims, 5 Drawing Sheets

(52) U.S. Cl.
CPC ........... *H04N 2013/0081* (2013.01); *H04N 2013/0085* (2013.01)

(56) References Cited

U.S. PATENT DOCUMENTS

| | | | |
|---|---|---|---|
| 2013/0141550 A1* | 6/2013 | Pockett | G03B 35/08 348/51 |
| 2013/0278727 A1* | 10/2013 | Tamir | H04N 13/0048 348/47 |
| 2014/0092218 A1* | 4/2014 | Xu | H04N 13/0221 348/46 |
| 2014/0118318 A1* | 5/2014 | Tsai | H04N 13/0402 345/207 |

FOREIGN PATENT DOCUMENTS

| | | |
|---|---|---|
| CN | 102986233 A | 3/2013 |
| EP | 2 434 766 A2 | 3/2012 |

\* cited by examiner

APPARATUS AND METHOD FOR REFERRING TO MOTION STATUS OF IMAGE CAPTURE DEVICE TO GENERATE STEREO IMAGE PAIR TO AUTO-STEREOSCOPIC DISPLAY FOR STEREO PREVIEW

CROSS REFERENCE TO RELATED APPLICATIONS

This application claims the benefit U.S. provisional application No. 61/824,060, filed on May 16, 2013 and incorporated herein by reference.

BACKGROUND

The disclosed embodiments of the present invention relate to displaying contents of images, and more particularly, to an apparatus and method for referring to a motion status of an image capture device to generate a stereo image pair to an auto-stereoscopic display for stereo preview.

With the development of science and technology, users are pursing stereoscopic and more real images rather than high quality images. There are two techniques of present stereo image display. One is to use a video output apparatus which collaborates with glasses (such as anaglyph glasses, polarization glasses or shutter glasses), while the other is to directly use a video output apparatus without any accompanying glasses. No matter which technique is utilized, the main theory of stereo image display is to make the left eye and the right eye see different images, thus the brain will regard the different images seen from two eyes as one stereo image.

The auto-stereoscopic display is one glassless stereo display apparatus, and has a high yield rate for mass production. Hence, the auto-stereoscopic displays have been broadly adopted to be the mainstream stereo displays on mobile devices. However, the auto-stereoscopic displays suffer from certain issues, including severer crosstalk and vergence-accommodation conflict. Further, user's eyes within the sweet spot could perceive the clearly separated left view and the right view. However, when the mobile device provides stereo preview to the user through the auto-stereoscopic display, the user may move the mobile device continuously to find the target scene to shoot. The sweet spot condition for user's eye cannot be always held during the stereo preview, which causes significant visual discomfort.

SUMMARY

In accordance with exemplary embodiments of the present invention, an apparatus and method for referring to a motion status of an image capture device to generate a stereo image pair to an auto-stereoscopic display for stereo preview are proposed to solve the above-mentioned problem.

According to a first aspect of the present invention, an exemplary stereo preview apparatus is disclosed. The exemplary stereo preview apparatus includes an auto-stereoscopic display, an input interface, a motion detection circuit and a visual transition circuit. The input interface is configured to receive at least an input stereo image pair including a left-view image and a right-view image generated from an image capture device. The motion detection circuit is configured to evaluate a motion status of the image capture device. The visual transition circuit is configured to generate an output stereo image pair based on the input stereo image pair, and output the output stereo image pair to the auto-stereoscopic display for stereo preview, wherein the visual transition circuit refers to the evaluated motion status to configure adjustment made to the input stereo image pair when generating the output stereo image pair.

According to a second aspect of the present invention, an exemplary stereo preview method is disclosed. The exemplary stereo preview method includes: receiving at least an input stereo image pair including a left-view image and a right-view image generated from an image capture device; evaluating a motion status of the image capture device; generating an output stereo image pair based on the input stereo image pair; and outputting the output stereo image pair to an auto-stereoscopic display for stereo preview, wherein the evaluated motion status is referenced to configure adjustment made to the input stereo image pair during generation of the output stereo image pair.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The key idea of the present invention is to exploit the nature of human visual system to reduce crosstalk and vergence-accommodation conflict resulting from the inherent characteristics of the auto-stereoscopic display and visual discomfort resulting from movement of the stereo camera. For example, we can take advantage of zero-disparity, lower contrast and smoothed image to avoid/mitigate the aforementioned problems. The user behavior of using the stereo camera is considered to generate an improved and more friendly graphical user interaction for stereo preview under a photo mode and a video capture mode. Further details of the proposed self-adapted stereo preview mechanism for three-dimensional (3D) photography on an auto-stereoscopic display are described as below.

Figure 1:
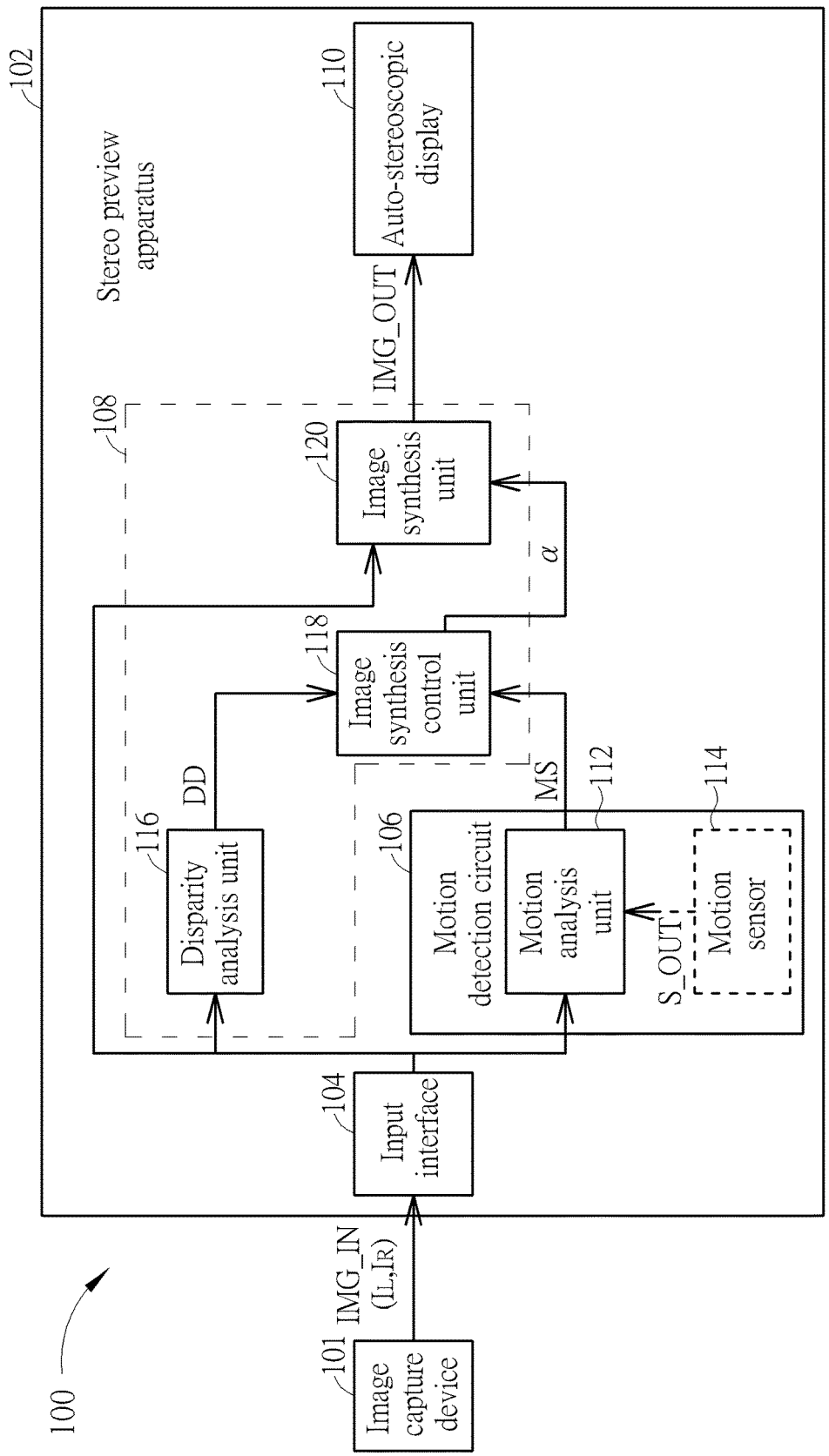
FIG. 1 is a block diagram illustrating an electronic device according to an embodiment of the present invention.

FIG. 1 is a block diagram illustrating an electronic device according to an embodiment of the present invention. The electronic device 100 may be a mobile device such as a smartphone, a feature phone or a tablet. The electronic device 100 includes an image capture device (e.g., a stereo camera) 101 and a stereo preview apparatus 102. When a photo mode or a video recording mode of the electronic device 100 is enabled, the image capture device 101 is used to generate at least one input stereo image pair IMG_IN, each including a left-view image $I_L$ and a right-view image $I_R$. The stereo preview apparatus 102 is used to provide stereo preview under the photo mode used for capturing a still stereo image or the video recording mode used for recording a stereo video sequence composed of a plurality of still stereo images. In this embodiment, the stereo preview apparatus 102 includes an input interface 102, a motion detection circuit 106, a visual transition circuit 108, and an auto-stereoscopic display 110.

The input interface 104 is coupled between the preceding image capture device 101 and the following motion detection circuit 106 and visual transition circuit 108, and is configured to receive each input stereo image pair IMG_IN generated from the image capture device 101. Therefore, the output of the image capture device 101 is accessible to the motion detection circuit 106 and visual transition circuit 108 through the input interface 104. By way of example, but not limitation, the input interface 104 may be a Camera Serial Interface (CSI) standardized by a Mobile Industry Processor Interface (MIPI).

Figure 2:
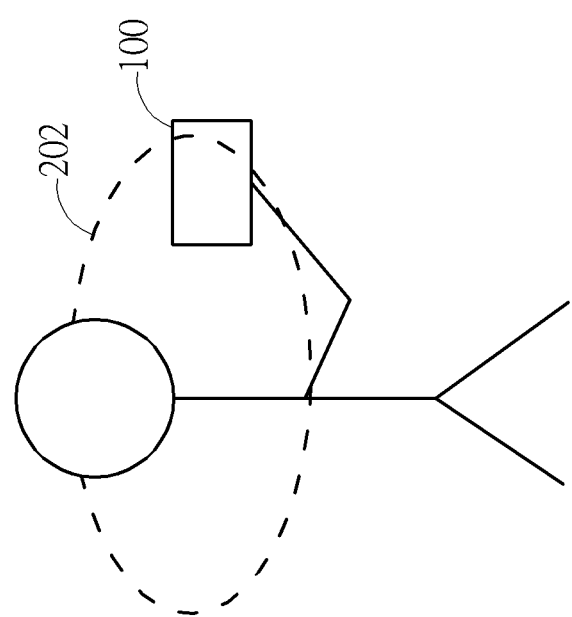
FIG. 2 is a diagram illustrating a trajectory of an electronic device when a user moves the electronic device.

The motion detection circuit 106 is configured to evaluate a motion status MS of the image capture device 101. In one exemplary design, the motion detection circuit 106 includes a motion analysis unit 112. The motion analysis unit 112 is configured to receive the output of the image capture device 101 through the input interface 104, and then perform a motion analysis operation upon the output of the image capture device 101 to evaluate the motion status MS. In other words, the motion analysis unit 112 employs an image processing based algorithm to analyze image contents of the output of the image capture device 101 when performing the motion analysis operation. Please refer to FIG. 2, which is a diagram illustrating a trajectory of an electronic device when a user moves the electronic device. In a case where the image capture device 101 is a stereo camera built in the electronic device 100, the stereo camera moves along a trajectory 202 due to movement of the electronic device 100. Hence, the motion analysis unit 112 may fit the camera motion to the trajectory 202, and determine whether it satisfies a viewing distance condition (for example, the viewing distance is within a range of 20-30 cm while the stereo camera is moving) and also satisfies a viewing angle condition (for example, the viewing angle is still perpendicular to the display screen, i.e., screen of the auto-stereoscopic display 110, while the stereo camera is moving). When the camera motion detected by the motion analysis unit 112 satisfies the viewing distance condition and the viewing angle condition, the user would feel that the stereo camera is still since user's head also rotates along with the moving display screen. In this case, the motion status MS evaluated by the motion analysis unit 112 may indicate that the image capture device (e.g., stereo camera) 101 is intended to be still relative to the user. However, when the camera motion detected by the motion analysis unit 112 fails to satisfy at least one of the viewing distance condition and the viewing angle condition, the motion status MS evaluated by the motion analysis unit 112 may indicate that the image capture device (e.g., stereo camera) 101 is not intended to be still relative to the user.

In another exemplary design, the motion detection circuit 106 includes the aforementioned motion analysis unit 112 and an optional motion sensor 114. The motion sensor 114 is configured to generate a sensor output S_OUT to the motion analysis unit 112. Thus, the sensor output S_OUT is referenced by the motion analysis operation performed by the motion analysis unit 112. More specifically, still objects captured by the image capture device 101 in motion may be erroneously regarded as moving objects due to relative movement of the image capture device 101. Hence, the sensor output S_OUT provides motion information which can be used by the motion analysis unit 112 to distinguish between moving objects and still objects within a scene captured by the image capture device 101 in motion. With the assistance of the motion sensor 114, the motion analysis unit 112 can produce a more accurate evaluation of the camera motion.

The visual transition circuit 108 is configured to generate an output stereo image pair IMG_OUT based on the input stereo image pair IMG_IN, and output the output stereo image pair IMG_OUT to the auto-stereoscopic display 110 for stereo preview. The visual transition circuit 108 refers to the evaluated motion status MS to configure adjustment made to the input stereo image pair IMG_IN when generating the output stereo image pair IMG_OUT. In a preferred embodiment of the present invention, the adjustment made to the input stereo image pair IMG_IN is disparity adjustment used to avoid/mitigate crosstalk and vergence-accommodation conflict resulting from the auto-stereoscopic display 110 and visual discomfort resulting from camera motion. In this embodiment, the visual transition circuit 108 with disparity adjustment capability includes a disparity analysis unit 116, an image synthesis control unit 118 and an image synthesis unit 120. The disparity analysis unit 116 is configured to estimate a disparity distribution DD possessed by the left-view image $I_L$ and the right-view image $I_R$ of one input stereo image pair IMG_IN. The disparity analysis unit 116 may uses any existing method to perform the disparity analysis.

Figure 3:
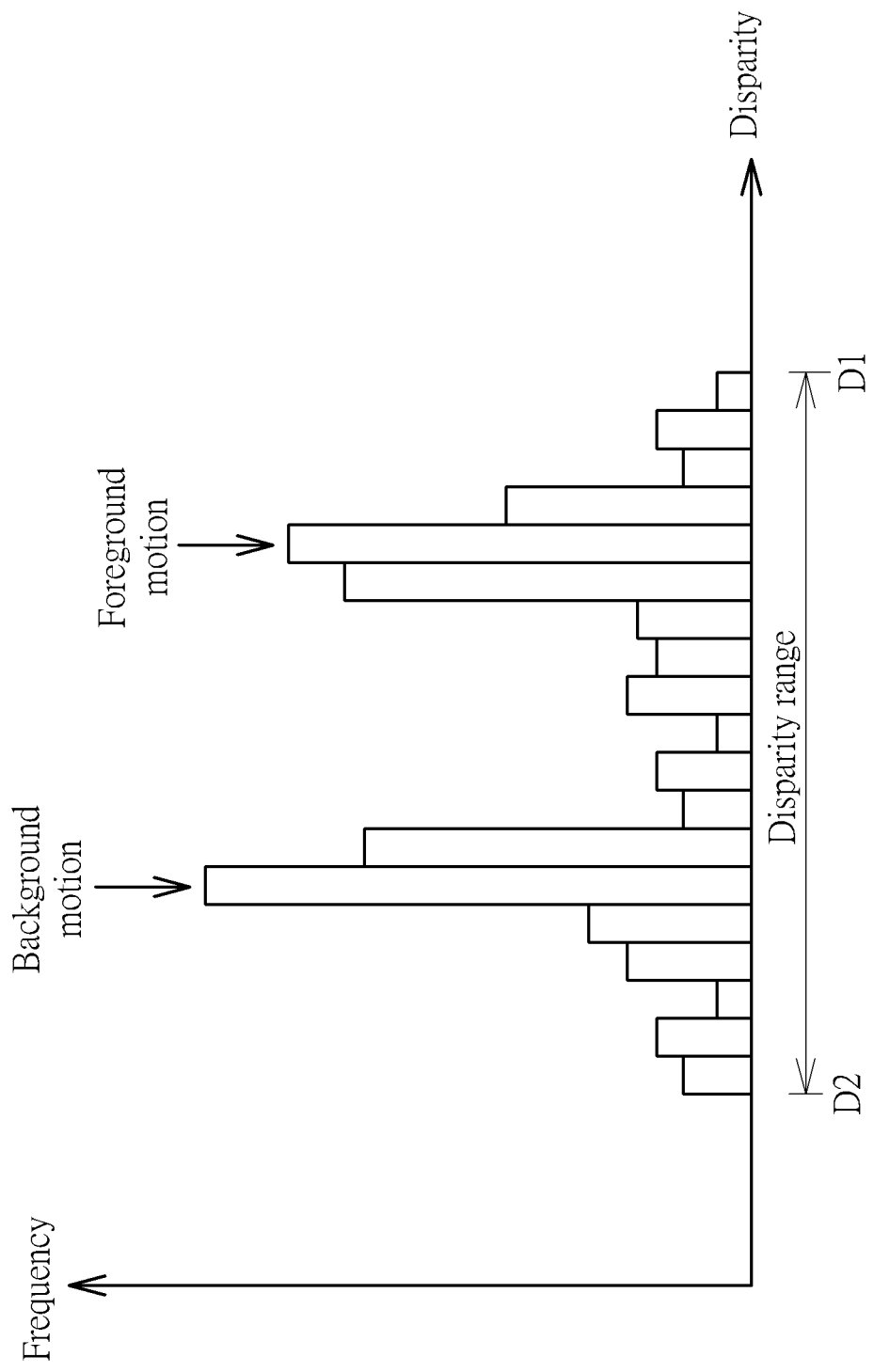
FIG. 3 is a histogram diagram of a disparity distribution of an input stereo image pair according to an embodiment of the present invention.

For example, the disparity analysis unit 102 may employ one of a stereo matching algorithm, a feature point extraction and matching algorithm, and a region-based motion estimation algorithm to get the statistical analysis of the disparity distribution DD. Please refer to FIG. 3, which is a histogram diagram of the disparity distribution DD of the input stereo image pair IMG_IN according to an embodiment of the present invention. As shown in FIG. 3, the disparity values derived from the left-view image $I_L$ and the right-view image $I_R$ are within a disparity range delimited by D1 and D2, where D2 is the largest positive disparity and D1 is the smallest negative disparity. When a pixel with zero disparity is displayed on the auto-stereoscopic display 110, the user may view the pixel exactly on the screen of the auto-stereoscopic display 110. When a pixel with negative disparity is displayed on the auto-stereoscopic display 110, the user may view the foreground pixel in front of the screen of the auto-stereoscopic display 110 (i.e., close to the user). When a pixel with positive disparity is displayed on the auto-stereoscopic display 110, the user may view the background pixel behind the screen of the auto-stereoscopic display 110 (i.e., far away from the user). Hence, the disparity distribution DD of the input stereo image pair IMG_IN decides user's depth perception when the input stereo image pair IMG_IN is displayed on the auto-stereoscopic display 110.

In general, the user feels most comfortable when the vergence is on the screen of the auto-stereoscopic display 110, i.e., a zero-disparity image pair is displayed on the auto-stereoscopic display 110. Besides, there is a comfort zone when an image pair with non-zero disparity is displayed on the auto-stereoscopic display 110. The comfort zone depends on the specification of the 3D display panel. For example, the auto-stereoscopic display 110 is a 3D display panel with a defined 3D vergence angle θ=typ(2D) ±1°(3D), where typ(2D) is the typical 2D vergence angle represented by $$2 \tan^{-1}\left(\frac{B}{2*d}\right),$$

B represents the distance between the right eye and the left eye, and d represents the distance between the panel and user's eyes. When the disparity distribution of the image pair is fitted into the comfort zone, the image pair with non-zero disparity can be perceived by the user within the defined 3D vergence angle θ of the auto-stereoscopic display 110. In this way, the user can have comfortable 3D perception. Further, user's eyes are less sensitive to the crosstalk when the image pair is to present a lower-contrast 3D image or a smoothed 3D image. Based on these inherent characteristics of human visual system, the present invention proposes using the image synthesis control unit 118 and the image synthesis unit 120 to dramatically reduce crosstalk, vergence-accommodation conflict and visual discomfort.

The image synthesis control unit 118 is configured to set at least one image synthesis parameter α according to the evaluated motion status MS and the estimated disparity distribution DD. Regarding the image synthesis unit 120, it is configured to generate at least one synthesized image according to the left-view image $I_L$, the right-view image $I_R$ and the at least one image synthesis parameter α, wherein the output stereo image pair IMG_OUT includes the at least one synthesized image.

In one exemplary design, one of the left-view image $I_L$ and the right-view image $I_R$ remains intact, and the other of the left-view image $I_L$ and the right-view image $I_R$ is replaced by a synthesized image derived from the left-view image $I_L$ and the right-view image $I_R$. For example, the output stereo image pair IMG_OUT includes the left-view image $I_L$ and the synthesized image I'(α) (which acts as a right-view image). By way of example, the one-view synthesis scheme may be implemented using view interpolation expressed by following equation.

$$I'(\alpha)=I'(\alpha u_L+(1-\alpha)u_R,\alpha v_L+(1-\alpha)v_R)=(1-\alpha)I_L(u_L,v_L)+\alpha I_R(u_R,v_R) \quad (1)$$

In above equation (1), a pixel $I_L(u_L,v_L)$ with coordinate $(u_L,v_L)$ in the left-view image $I_L$ and a pixel $I_R(u_R,v_R)$ with coordinate $(u_R,v_R)$ in the right-view image $I_R$ are corresponding points, and blended to form a pixel I'(αu_L+(1−α)u_R,αv_L+(1−α)v_R) with coordinate (αu_L+(1−α)u_R,αv_L+(1−α)v_R) in the synthesized image I'.

Alternatively, the one-view synthesis scheme may be implemented using photometric view interpolation expressed by following equation.

$$I'(\alpha)=(1-\alpha)I_L+\alpha I_R \quad (2)$$

In above equation (2), a pixel $I_L(x,y)$ with coordinate (x,y) in the left-view image $I_L$ and a pixel $I_R(x,y)$ with the same coordinate (x,y) in the right-view image $I_R$ are blended to form a pixel I'(x,y) with the same coordinate (x,y) in the synthesized image I'.

In another exemplary design, both of the left-view image $I_L$ and the right-view image $I_R$ are replaced by synthesized images each derived from the left-view image $I_L$ and the right-view image $I_R$. For example, the output stereo image pair IMG_OUT includes one synthesized image I'(1−α) (which acts as a left-view image) and another synthesized image I'(α) (which acts as a right-view image).

By way of example, the two-view synthesis scheme may be implemented using view interpolation expressed by following equations.

$$I'(\alpha)=I'(\alpha u_L+(1-\alpha)u_R,\alpha v_L+(1-\alpha)v_R)=(1-\alpha)I_L(u_L,v_L)+\alpha I_R(U_R,v_R) \quad (3)$$

$$I'(1-\alpha)=I'((1-\alpha)u_L+\alpha u_R,(1-\alpha)v_L+\alpha v_R)=\alpha I_L(u_L,v_L)+(1-\alpha)I_R(u_R,v_R) \quad (4)$$

Alternatively, the two-view synthesis scheme may be implemented using photometric view interpolation expressed by following equations.

$$I'(\alpha)=(1-\alpha)I_L+\alpha I_R \quad (5)$$

$$I'(1-\alpha)=\alpha I_L+(1-\alpha)I_R \quad (6)$$

In above equations (1) and (2), 0≤α≤1 and α∈R; and in above equations (3)-(6), 0≤α≤0.5 and α∈R. Thus, the disparity distribution of the output stereo image pair IMG_OUT can be adaptively adjusted by setting the image synthesis parameter α based on the disparity distribution DD and the motion status MS. More specifically, when the image synthesis parameter α is set by a smaller value, the output stereo image pair IMG_OUT would be more like a zero-disparity image pair for reduction of crosstalk and vergence-accommodation conflict; and when the image synthesis parameter α is set by a larger value, the output stereo image pair IMG_OUT would be more like the input stereo image pair IMG_IN for stronger 3D perception. In this embodiment, when the evaluated motion status MS indicates that the image capture device 101 is intended to be still relative to the user, the image synthesis control unit 118 adjusts the at least one image synthesis parameter α to make the output stereo image pair IMG_OUT approach the input stereo image pair IMG_IN; and when the evaluated motion status MS indicates that the image capture device 101 is not intended to be still relative to the user, the image synthesis control unit 118 adjusts the at least one image synthesis parameter α to make the output stereo image pair IMG_OUT approach a zero-disparity image pair or have a disparity distribution fitted into a comfort zone specified by the auto-stereoscopic display 110.

Figure 4:
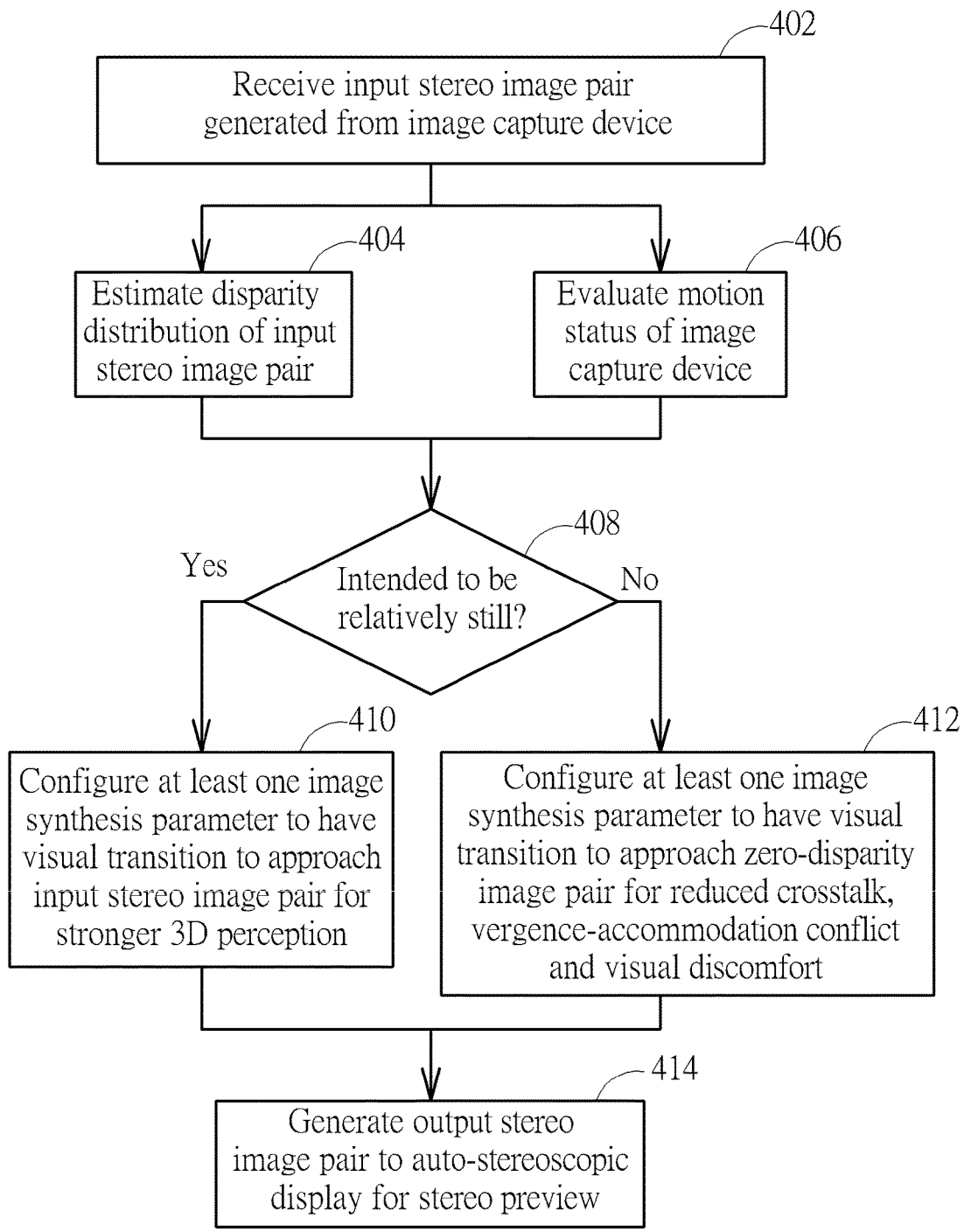
FIG. 4 is a flowchart illustrating a stereo preview method according to a first embodiment of the present invention.

FIG. 4 is a flowchart illustrating a stereo preview method according to a first embodiment of the present invention. Provided that the result is substantially the same, the steps are not required to be executed in the exact order shown in FIG. 4. The exemplary stereo preview method is employed by the stereo preview apparatus 102 when the electronic device 100 equipped with the image capture device 101 enters a photo mode, and may be briefly summarized as below.

Step 402: Receive at least one input stereo image pair including a left-view image and a right-view image generated from an image capture device (e.g., a stereo camera). Go to steps 404 and 406.

Step 404: Estimate a disparity distribution of the at least one input stereo image pair. Go to step 408.

Step 406: Evaluate a motion status of the image capture device.

Step 408: Check if the evaluated motion status indicates that the image capture device is intended to be still relative to a user. If yes, go to step 410; otherwise, go to step 412.

Step 410: Configure at least one image synthesis parameter to have a visual transition to approach the input stereo image pair for stronger 3D perception. Go to step 414.

Step 412: Configure at least one image synthesis parameter to have a visual transition to approach a zero-disparity image pair for reduced crosstalk, vergence-accommodation conflict and visual discomfort.

Step 414: Generate an output stereo image pair to an auto-stereoscopic display for stereo preview. The output stereo image pair may have one synthesized image or two synthesized images, depending upon actual design consideration.

It should be noted that if a capture event is triggered by the user pressing a physical/virtual shutter button while the stereo preview is displayed on the auto-stereoscopic display, a stereo image pair corresponding to the capture event is stored as one captured stereo image output for the photo mode. In other words, the capture event is not triggered before the stereo preview is displayed. As a person skilled in the art can readily understand details of each step in FIG. 4 after reading above paragraphs, further description is omitted here for brevity.

Figure 5:
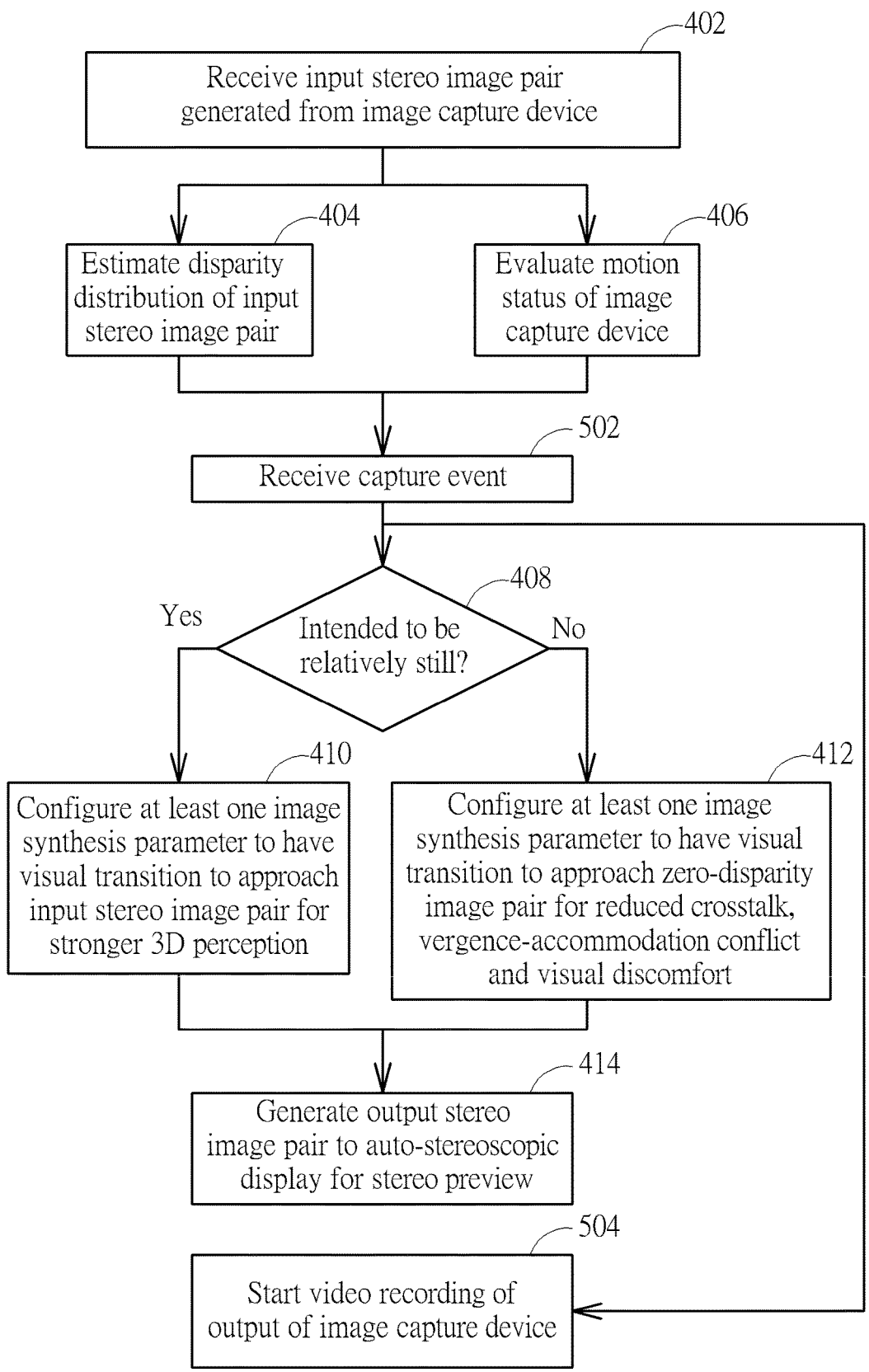
FIG. 5 is a flowchart illustrating a stereo preview method according to a second embodiment of the present invention.

FIG. 5 is a flowchart illustrating a stereo preview method according to a second embodiment of the present invention. Provided that the result is substantially the same, the steps are not required to be executed in the exact order shown in FIG. 5. The exemplary stereo preview method is employed by the stereo preview apparatus 102 when the electronic device 100 equipped with the image capture device 101 enters a video recording mode. The major difference between the stereo preview methods shown in FIG. 4 and FIG. 5 is that the stereo preview method in FIG. 5 further includes steps 502 and 504 detailed as below.

Step 502: Receive a capture event.

Step 504: Start video recording of an output of the image capture device.

It should be noted that, after a capture event is triggered by the user pressing a physical/virtual shutter button, the stereo preview of each output stereo image pair IMG_OUT is displayed on the auto-stereoscopic display and a video recording operation of each input stereo image pair IMG_IN is started, simultaneously. The output stereo image pair IMG_OUT is not necessarily the same as the input stereo image pair IMG_IN. In other words, due to the fact that the capture event is triggered before the stereo preview is displayed, an input stereo image pair IMG_IN with an original disparity distribution is recorded while an output stereo image pair IMG_OUT with an adjusted disparity distribution is displayed for stereo preview. As a person skilled in the art can readily understand details of other steps in FIG. 5 after reading above paragraphs, further description is omitted here for brevity.

In summary, the present invention provides a novel graphical user interface (GUI) for stereo preview on a mobile device equipped with a stereo camera and an auto-stereoscopic display. More specifically, based on the motion status of the stereo camera, a self-adapted stereo preview for 3D photography on an auto-stereoscopic display under a photo mode or a video recording mode is provided, such that the user can perceive a more comfortable stereo preview while the stereo camera is moving.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stereo preview apparatus, comprising:
   an auto-stereoscopic display;
   an input interface, configured to receive at least an input stereo image pair including a left-view image and a right-view image generated from an image capture device;
   a motion detection circuit, configured to evaluate a motion status of the image capture device; and
   a visual transition circuit, configured to generate an output stereo image pair from the input stereo image pair, and output the output stereo image pair to the auto-stereoscopic display for stereo preview, wherein the visual transition circuit refers to an image synthesis parameteraset according to the evaluated motion status to configure adjustment made to the input stereo image pair when generating the output stereo image pair;
   wherein when a left-view output image included in the output stereo image pair is adjusted to be different from the left-view image included in the input stereo image pair, the left-view output image is a synthesized image $I'(1-\alpha)$ generated according to the left-view image $I_L$ and the right-view image $I_R$ included in the input stereo image pair according to the equation $I'(1-\alpha)=\alpha I_{L+}(1-\alpha)I_R$, and when a right-view output image included in the output stereo image pair is adjusted to be different from the right-eye image included in the input stereo image pair, the right-view output image is a synthesized image $I'(\alpha)$ generated according to the right-view image $I_R$ and the left-view image $I_L$ included in the input stereo image pair according to the equation $I'(\alpha)=(1-\alpha)I_L+\alpha I_R$.

2. The stereo preview apparatus of claim 1, wherein the stereo preview is displayed under a photo mode.

3. The stereo preview apparatus of claim 1, wherein the stereo preview is displayed under a video capture mode.

4. The stereo preview apparatus of claim 1, wherein the motion detection circuit comprises:
   a motion analysis unit, configured to receive an output of the image capture device, and perform a motion analysis operation upon the output of the image capture device to evaluate the motion status.

5. The stereo preview apparatus of claim 4, wherein the motion detection circuit further comprises:
   a motion sensor, configured to generate a sensor output to the motion analysis unit;
   wherein the sensor output is referenced by the motion analysis operation performed by the motion analysis unit.

6. The stereo preview apparatus of claim 1, wherein the adjustment is disparity adjustment.

7. The stereo preview apparatus of claim 6, wherein the visual transition circuit comprises:
   a disparity analysis unit, configured to estimate a disparity distribution possessed by the left-view image and the right-view image;

an image synthesis control unit, configured to set the image synthesis parameter a according to the evaluated motion status and the estimated disparity distribution; and an image synthesis unit, configured to generate at least one synthesized image according to the left-view image, the right-view image and the at least one image synthesis parameter, wherein the output stereo image pair includes the at least one synthesized image.

8. The stereo preview apparatus of claim 7, wherein the at least one synthesized image includes a synthesized left-view image and a synthesized right-view image of the output stereo image pair.

9. The stereo preview apparatus of claim 7, wherein when the evaluated motion status indicates that the image capture device is intended to be still relative to a user, the image synthesis control unit adjusts the at least one image synthesis parameter to make the output stereo image pair approach the input stereo image pair.

10. The stereo preview apparatus of claim 7, wherein when the evaluated motion status indicates that the image capture device is not intended to be still relative to a user, the image synthesis control unit adjusts the at least one image synthesis parameter to make the output stereo image pair approach a zero-disparity image pair or have a disparity distribution fitted into a comfort zone specified by the auto-stereoscopic display.

11. A stereo preview method, comprising:
receiving at least an input stereo image pair including a left-view image and a right-view image generated from an image capture device;
evaluating a motion status of the image capture device; and generating an output stereo image pair from the input stereo image pair, and outputting the output stereo image pair to an auto-stereoscopic display for stereo preview, wherein the evaluated motion status is referenced to set an image synthesis parameter which is used to configure adjustment made to the input stereo image pair during generation of the output stereo image pair;
wherein when a left-view output image included in the output stereo image pair is adjusted to be different from the left-view image included in the input stereo image pair, the left-view output image is a synthesized image $I'(1-\alpha)$ generated according to the left-view image $I_L$ and the right-view image $I_R$ included in the input stereo image pair according to the equation $I'(1-\alpha)=\alpha I_L+(1-\alpha)I_R$, and when a right-view output image included in the output stereo image pair is adjusted to be different from the right-view image included in the input stereo image pair, the right-view output image is a synthesized image $I'(\alpha)$ generated according to the right-view image $I_R$ and the left-view image $I_L$ included in the input stereo image pair according to the equation $I'(\alpha)=(1-\alpha)I_L+\alpha I_R$.

12. The stereo preview method of claim 11, wherein the stereo preview is displayed under a photo mode.

13. The stereo preview method of claim 11, wherein the stereo preview is displayed under a video capture mode.

14. The stereo preview method of claim 11, wherein the step of evaluating the motion status of the image capture device comprises:
receiving an output of the image capture device; and
performing a motion analysis operation upon the output of the image capture device to evaluate the motion status.

15. The stereo preview method of claim 14, wherein the step of evaluating the motion status of the image capture device further comprises:
receiving a sensor output from a motion sensor;
wherein the sensor output is referenced by the motion analysis operation.

16. The stereo preview method of claim 11, wherein the adjustment is disparity adjustment.

17. The stereo preview method of claim 16, wherein the step of generating the output stereo image pair based on the input stereo image pair comprises:
estimating a disparity distribution possessed by the left-view image and the right-view image;
setting the image synthesis parameter a according to the evaluated motion status and the estimated disparity distribution; and
generating at least one synthesized image according to the left-view image, the right-view image and the at least one image synthesis parameter, wherein the output stereo image pair includes the at least one synthesized image.

18. The stereo preview method of claim 17, wherein the at least one synthesized image includes a synthesized left-view image and a synthesized right-view image of the output stereo image pair.

19. The stereo preview method of claim 17, wherein when the evaluated motion status indicates that the image capture device is intended to be still relative to a user, the at least one image synthesis parameter is adjusted to make the output stereo image pair approach the input stereo image pair.

20. The stereo preview method of claim 17, wherein when the evaluated motion status indicates that the image capture device is not intended to be still relative to a user, the at least one image synthesis parameter is adjusted to make the output stereo image pair approach a zero-disparity image pair or have a disparity distribution fitted into a comfort zone specified by the auto-stereoscopic display.

* * * * *